(12) United States Patent
Yamaguchi

(10) Patent No.: US 9,405,629 B2
(45) Date of Patent: Aug. 2, 2016

(54) INFORMATION PROCESSING SYSTEM, METHOD FOR CONTROLLING INFORMATION PROCESSING SYSTEM, AND STORAGE MEDIUM

(71) Applicant: FUJITSU LIMITED, Kawasaki-shi, Kanagawa (JP)

(72) Inventor: Yuji Yamaguchi, Suginami (JP)

(73) Assignee: FUJITSU LIMITED, Kawasaki (JP)

( * ) Notice: Subject to any disclaimer, the term of this patent is extended or adjusted under 35 U.S.C. 154(b) by 56 days.

(21) Appl. No.: 14/597,530

(22) Filed: Jan. 15, 2015

(65) Prior Publication Data
US 2015/0234711 A1 Aug. 20, 2015

(30) Foreign Application Priority Data

Feb. 14, 2014 (JP) .................. 2014-026436

(51) Int. Cl.
*G06F 11/00* (2006.01)
*G06F 11/14* (2006.01)
*G06F 11/07* (2006.01)
*G06F 11/20* (2006.01)
*G06F 11/30* (2006.01)

(52) U.S. Cl.
CPC .......... *G06F 11/1441* (2013.01); *G06F 11/004* (2013.01); *G06F 11/0793* (2013.01); *G06F 11/3058* (2013.01); *G06F 11/2015* (2013.01); *G06F 11/3031* (2013.01); *G06F 2201/81* (2013.01)

(58) Field of Classification Search
USPC .......................................................... 714/24
See application file for complete search history.

(56) References Cited

U.S. PATENT DOCUMENTS

| | | | | |
|---|---|---|---|---|
| 2004/0153779 A1* | 8/2004 | Laurosch | ........... | G05B 19/0428 714/25 |
| 2006/0129883 A1* | 6/2006 | Nakamura | ................ | G06F 1/24 714/14 |
| 2010/0275061 A1* | 10/2010 | Lee | ..................... | G06F 11/2294 714/27 |

FOREIGN PATENT DOCUMENTS

| | | |
|---|---|---|
| JP | 63-298462 | 12/1988 |
| JP | 2-132529 | 5/1990 |
| JP | 9-167028 | 6/1997 |
| JP | 2001-92738 | 4/2001 |
| JP | 2008-28456 | 2/2008 |

* cited by examiner

*Primary Examiner* — Sarai Butler
(74) *Attorney, Agent, or Firm* — Staas & Halsey LLP

(57) ABSTRACT

An information processing system includes a first information processing apparatus including a first processor, a first detector configured to detect vibration, a first communication device, and a second processor coupled to the first detector and configured to cause the first processor to stop first data processing executed by the first processor when the vibration is detected by the first detector, and a second information processing apparatus including a third processor, a second communication device configured to communicate with the first communication device, and a fourth processor configured to cause the third processor to stop second data processing executed by the third processor when the fourth processor receives, from the second processor through the first communication device and the second communication device, a first notification that indicates that the vibration has been detected.

19 Claims, 11 Drawing Sheets

INFORMATION PROCESSING SYSTEM, METHOD FOR CONTROLLING INFORMATION PROCESSING SYSTEM, AND STORAGE MEDIUM

CROSS-REFERENCE TO RELATED APPLICATION

This application is based upon and claims the benefit of priority of the prior Japanese Patent Application No. 2014-026436 filed on Feb. 14, 2014, the entire contents of which are incorporated herein by reference.

FIELD

The embodiments discussed herein are related to an information processing system, a method for controlling an information processing system, and a storage medium.

BACKGROUND

In order to maintain the reliability of an information processing system such as a server, data held in the information processing system is preferably maintained upon the occurrence of an earthquake, and information processing executed by the information processing system preferably continues after the stop of the earthquake. For example, a system that stops a process based on the magnitude of vibration caused by an earthquake, or stops the process and saves data based on the magnitude of the vibration caused by the earthquake, or stops the process, saves the data, and shuts off a power supply based on the magnitude of the vibration caused by the earthquake has been proposed.

An information processing system in which if a failure is detected in a first server that currently provides a service, a second server that is a standby server takes over the service and an Internet Protocol (IP) address used for the service has been proposed.

An information processing apparatus, which supplies power from a battery upon a reduction in a voltage to a value lower than a predetermined value and backs up data and terminates a system upon an increase in a temperature to a value higher than a predetermined value, has been proposed. If an information processing apparatus of this type is connected to a network, information that represents a voltage drop, a temperature rise, and the like is informed to an information processing apparatus such as a managing apparatus through the network. Japanese Laid-open Patent Publication Nos. 9-167028, 2008-28456, and 2001-92738 are examples of related art.

SUMMARY

According to an aspect of the invention, an information processing system includes a first information processing apparatus including a first processor, a first detector configured to detect vibration, a first communication device, and a second processor coupled to the first detector and configured to cause the first processor to stop first data processing executed by the first processor when the vibration is detected by the first detector, and a second information processing apparatus including a third processor, a second communication device configured to communicate with the first communication device, and a fourth processor configured to cause the third processor to stop second data processing executed by the third processor when the fourth processor receives, from the second processor through the first communication device and the second communication device, a first notification that indicates that the vibration has been detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

For example, if a power supply of an information processing system is interrupted during vibration caused by an earthquake, there is a risk that a shutdown process may not be normally executed and it may be difficult to restart the information processing system after the stop of the earthquake. Specifically, if the power supply of the information processing system is interrupted during the vibration caused by the earthquake, there is a risk that the reliability of the information processing system may be reduced.

An information processing system disclosed herein, a method disclosed herein for controlling an information processing system, and a program disclosed herein for controlling an information processing system each aim at suppressing a reduction, caused by the occurrence of an earthquake, in the reliability of the information processing system.

Figure 1:
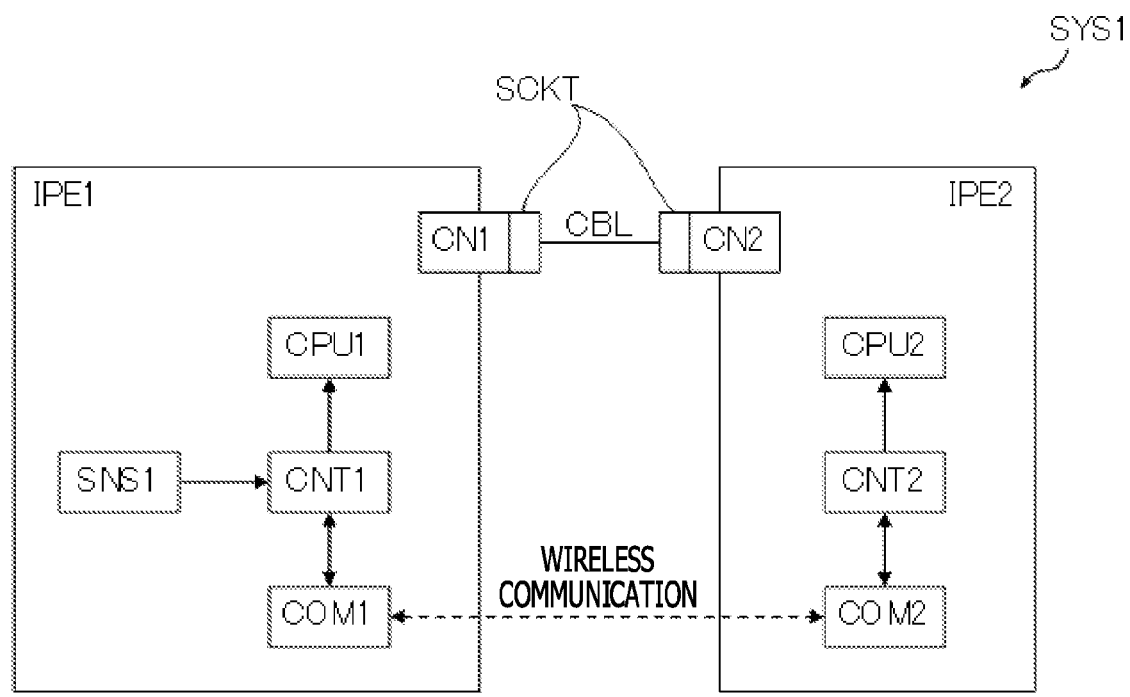
FIG. 1 is a diagram illustrating an embodiment of an information processing system.

FIG. 1 illustrates an embodiment of the information processing system. An information processing system SYS1 illustrated in FIG. 1 includes an information processing apparatus IPE1 and an information processing apparatus IPE2 connected to the information processing apparatus IPE1. For example, the information processing apparatuses IPE1 and IPE2 are connected to each other through a connector CN1 provided for the information processing apparatus IPE1 and a connector CN2 provided for the information processing apparatus IPE2. The connectors CN1 and CN2 are connected to each other through a cable CBL in FIG. 1, but may be connected directly to each other without the cable CBL. For example, the information processing apparatuses IPE1 and IPE2 are stored in a single rack or may be stored in different racks. The cable CBL is connected to the connectors CN1 and CN2 through connecting parts (or connecting members) attached to both ends of the cable CBL. The connecting parts are sockets SCKT or the like.

The information processing apparatus IPE1 includes a processor CPU1 such as a central processing unit (CPU), a detector SNS1, a control device CNT1, and a communication device COM1. The information processing apparatus IPE2 includes a processor CPU2 such as a CPU, a control device CNT2, and a communication device COM2. For example, the control devices CNT1 and CNT2 are processors such as CPUs that each operate by executing a program. The processors CPU1 and CPU2 are an example of arithmetic processing units configured to execute arithmetic processing.

In the information processing apparatus IPE1, the detector SNS1 detects the magnitude (for example, the magnitude of vibration of the rack) of vibration caused by an earthquake or the like. The communication device COM1 wirelessly communicates with the communication device COM2 of the information processing apparatus IPE2. The control device CNT1 controls an operation of the processor CPU1 and an operation of the communication device COM1 based on the magnitude, detected by the detecting device SNS1, of the vibration. Examples of operations of the control device CNT1 are illustrated in FIGS. 2 and 3.

In the information processing apparatus IPE2, the communication device COM2 wirelessly communicates with the communication device COM1 of the information processing apparatus IPE1. The control device CNT2 controls an operation of the processor CPU2 based on information received from the information processing apparatus IPE1 through the communication device COM2. Examples of operations of the control device CNT2 are illustrated in FIGS. 2 and 3.

Figure 2:
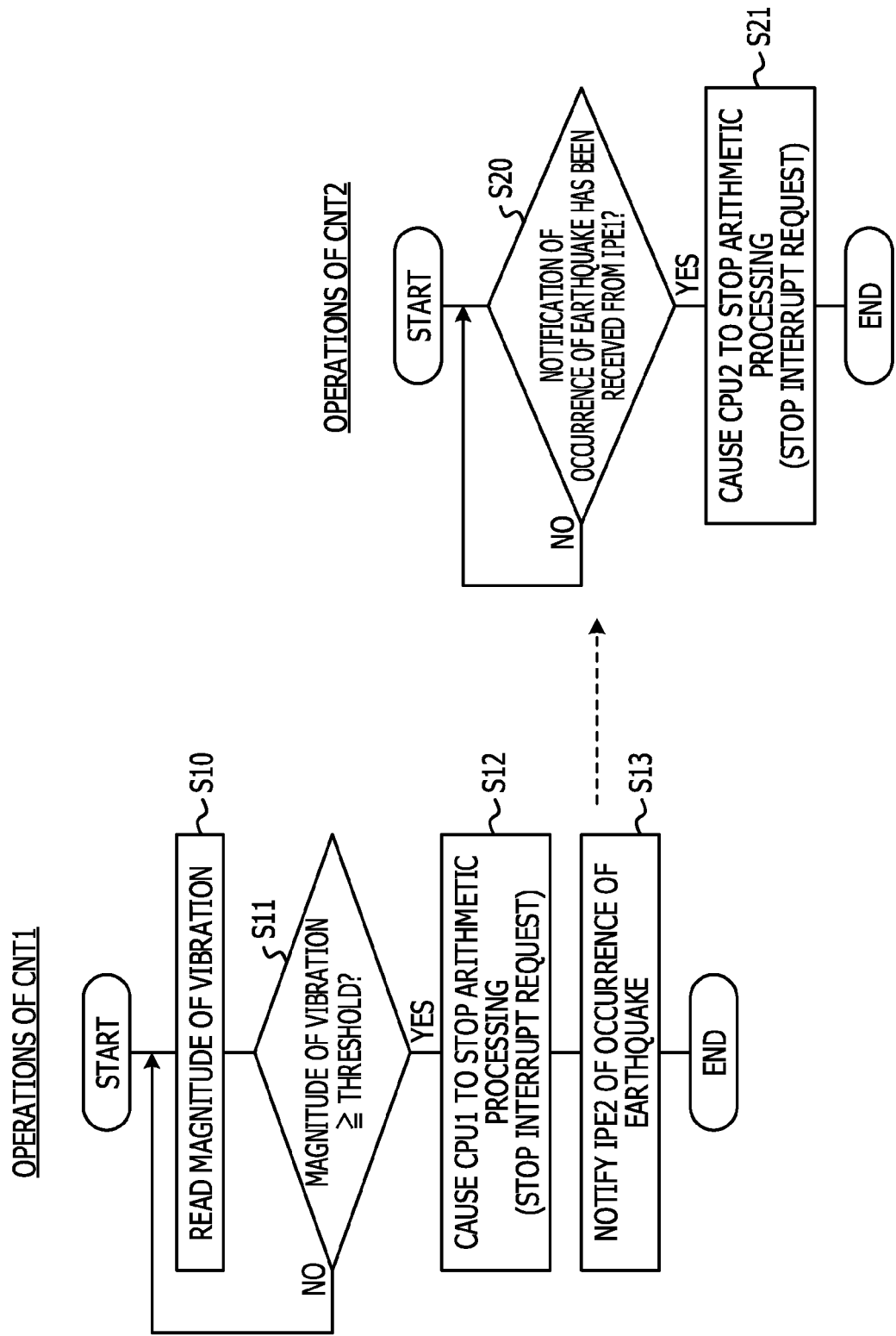
FIG. 2 is a diagram illustrating an example of operations of control devices illustrated in FIG. 1.
Figure 3:
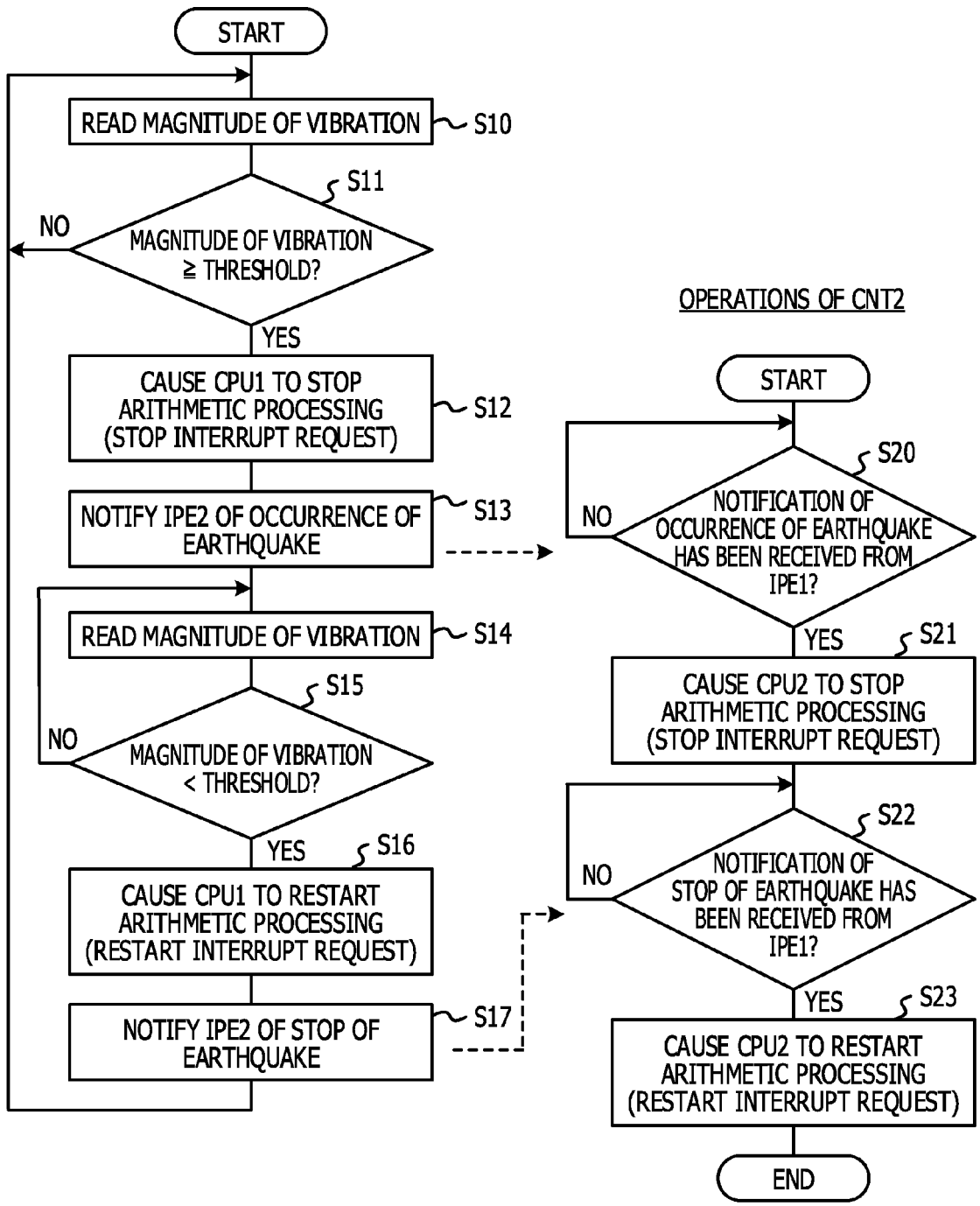
FIG. 3 is a diagram illustrating another example of the operations of the control devices illustrated in FIG. 1.

FIG. 2 illustrates an example of the operations of the control devices CNT1 and CNT2 illustrated in FIG. 1. The left side of FIG. 2 illustrates the example of the operations of the control device CNT1, while the right side of FIG. 2 illustrates the example of the operations of the control device CNT2. An overall process illustrated in FIG. 2 is achieved by causing the control devices CNT1 and CNT2 to execute a program. Specifically, FIG. 2 illustrates the embodiment of the method for controlling the information processing system and the program for controlling the information processing system. The operations of the control device CNT1 may be achieved by a logical circuit (hardware) of the control device CNT1, while the operations of the control device CNT2 may be achieved by a logical circuit (hardware) of the control device CNT2.

First, in step S10, the control device CNT1 reads, from the detector SNS1, the magnitude of the vibration detected by the detector SNS1. Next, in step S11, the control device CNT1 detects whether or not the magnitude of the vibration detected by the detector SNS1 is equal to or larger than a set threshold. For example, the threshold is a predetermined magnitude that is, for example, seismic intensity of 5, or 250 Gal (seismic intensity of upper 5), or the like and represents the vibration caused by the earthquake. If the magnitude of the vibration is equal to or larger than the threshold, the process proceeds to step S12. If the magnitude of the vibration is smaller than the threshold, the control device CNT1 repeats an operation of reading the magnitude of vibration detected by the detector SNS1.

For example, if vibration of which the magnitude is equal to or larger than the threshold occurs at the rack, there is a risk that a connecting part that connects the socket SCKT of the cable CBL to the connector CN1 (or the connector CN2) may be deformed due to the vibration, contact resistance of a contact point of a signal line may change, or the signal line may be momentary disconnected. The change of contact resistance or the disconnection may cause noise in a signal transmitted through the connectors CN1 and CN2 or may momentary interrupt the transmission of the signal. If the noise occurs or the transmission of the signal is momentary interrupted, there is a risk that information may not be normally transmitted between the information processing apparatuses IPE1 and IPE2 and that the information processing apparatuses IPE1 and IPE2 may malfunction. In addition, if vibration with a large magnitude continues for a long time and the connecting part that connects the socket SCKT of the cable CBL to the connector CN1 (or the connector CN2) is repeatedly deformed, there is a risk that the socket SCKT may be disconnected from the connector CN1 (or the connector CN2). If the socket SCKT is disconnected from the connector CN1 (or the connector CN2), it is difficult for the information processing system SYS1 to execute information processing. Even if a signal is not transmitted between the connectors CN1 and CN2, the control device CNT1 is able to wirelessly communicate with the control device CNT2 through the communication devices COM1 and COM2.

In step S12, the control device CNT1 causes the processor CPU1 to stop arithmetic processing executed by the processor CPU1. This is due to the fact that there is a risk that the information processing apparatus IPE1 may erroneously operate. The process of step S12 is a process of causing the processor CPU1 to stand by until the stop of the vibration caused by the earthquake without executing the shutdown process. For example, after the vibration caused by the earthquake stops, the processor CPU1 may quickly restart the stopped arithmetic processing.

For example, the control device CNT1 issues, to the processor CPU1, a stop interrupt request to instruct the processor CPU1 to stop the arithmetic processing, thereby notifies the processor CPU1 of the occurrence of the earthquake, and causes the processor CPU1 to stop the executed arithmetic processing. For example, the processor CPU1 executes an interrupt process routine in response to the stop interrupt request and thereby temporarily stops (suspends) the executed arithmetic processing. Thus, the processor CPU1 may restart the temporarily stopped arithmetic processing after recovering from the interrupt process routine. For example, the processor CPU1 that currently executes the interrupt process routine recovers from the interrupt process routine and thereby restarts the arithmetic processing in response to an instruction, output from the control device CNT1 after the stop of the vibration caused by the earthquake, to restart the arithmetic processing.

Next, in step S13, the control device CNT1 notifies the communication device COM2 included in the information processing apparatus IPE2 of the occurrence of the earthquake through the communication device COM1.

In step S20, the control device CNT2 determines whether or not the control device CNT2 has received the notification representing the occurrence of the earthquake from the information processing apparatus IPE1 through the communication device COM2. If the control device CNT2 has received the notification representing the occurrence of the earthquake, the process proceeds to step S21. If the control device CNT2 has not received the notification representing the occurrence of the earthquake, the process of step S20 is repeated.

In step S21, the control device CNT2 causes the processor CPU2 to stop arithmetic processing executed by the processor CPU2 in step S21. This is due to the fact that there is a risk that the information processing apparatus IPE2 may erroneously operate. The process of step S21 is a process of causing the processor CPU2 to stand by until the stop of the vibration caused by the earthquake without executing the shutdown process. For example, after the vibration caused by the earthquake stops, the processor CPU2 may quickly restart the stopped arithmetic processing.

For example, the control device CNT2 issues, to the processor CPU2, a stop interrupt request to instruct the processor CPU2 to stop the arithmetic processing, thereby notifies the processor CPU2 of the occurrence of the earthquake, and causes the processor CPU2 to stop the executed arithmetic processing. For example, the processor CPU2 executes an interrupt process routine in response to the stop interrupt request and thereby temporarily stops (suspends) the executed arithmetic processing. Thus, the processor CPU2 may restart the temporarily stopped arithmetic processing after recovering from the interrupt process routine. For example, the control device CNT2 instructs the processor CPU2 to restart the arithmetic processing based on a notification provided by the control device CNT1 and representing the stop of the vibration caused by the earthquake. The processor CPU2 that currently executes the interrupt process routine recovers from the interrupt process routine and thereby restarts the arithmetic processing in response to the instruction to restart the arithmetic processing.

FIG. 3 illustrates the other example of the operations of the control devices CNT1 and CNT2 illustrated in FIG. 1. Processes that are illustrated in FIG. 3 and are the same as or similar to the processes illustrated in FIG. 2 are represented by the same reference symbols as those illustrated in FIG. 2, and a detailed description thereof is omitted. An overall process illustrated in FIG. 3 is achieved by causing the control devices CNT1 and CNT2 to execute a program. Specifically, FIG. 3 illustrates the embodiment of the method for controlling the information processing system and the program for controlling the information processing system, similarly to FIG. 2. Operations illustrated in FIG. 3 include the operations illustrated in FIG. 2 and cause the execution of a process of causing the processors CPU1 and CPU2 to restart arithmetic processing if the magnitude of vibration becomes smaller than the threshold. Steps S10, S11, S12, S13, S20, and S21 that are illustrated in FIG. 3 are the same as or similar to FIG. 2.

In step S14, the control device CNT1 reads, from the detector SNS1, the magnitude of the vibration detected by the detector SNS1. Next, in step S15, the control device CNT1 detects whether or not the magnitude of the vibration detected by the detector SNS1 is smaller than a threshold. For example, the threshold is equal to the threshold used for the determination of step S11. If the magnitude of the vibration is smaller than the threshold, the process proceeds to step S16. If the magnitude of the vibration is equal to or larger than the threshold, the process returns to step S14.

Specifically, during the time when the vibration caused by the earthquake continues and the magnitude of the vibration is equal to or larger than the threshold, the control device CNT1 repeats the operation of reading the magnitude of vibration detected by the detector SNS1. In addition, if the magnitude of the vibration caused by the earthquake becomes smaller than the threshold, there is no risk that noise occurs in a signal transmitted through the connectors CN1 and CN2 or that the transmission of the signal is not momentary interrupted. Thus, there is no risk that the information processing apparatuses IPE1 and IPE2 erroneously operate.

In step S16, the control device CNT1 causes the processor CPU1 to restart the arithmetic processing stopped in step S12. This is due to the fact that there is no risk that the information processing apparatus IPE1 may erroneously operate. For example, the control device CNT1 issues, to the processor CPU1, a restart interrupt request to instruct the processor CPU1 to restart the arithmetic processing, thereby notifies the processor CPU1 of the stop of the vibration caused by the earthquake, and causes the processor CPU1 to restart the stopped arithmetic processing. For example, the processor CPU1 recovers from the interrupt process routine and thereby restarts the temporarily stopped arithmetic processing in response to the restart interrupt request. Next, in step S17, the control device CNT1 notifies the communication device COM2 of the information processing apparatus IPE2 of the stop of the vibration caused by the earthquake through the communication device COM1.

In step S22, the control device CNT2 determines whether or not the control device CNT2 has received the notification representing the stop of the vibration caused by the earthquake from the information processing apparatus IPE1 through the communication device COM2. If the control device CNT2 has received the notification representing the stop of the vibration caused by the earthquake, the process proceeds to step S23. If the control device CNT2 has not received the notification representing the stop of the vibration caused by the earthquake, the process of step S22 is repeated.

In step S23, the control device CNT2 causes the processor CPU2 to restart the arithmetic processing stopped in step S21. This is due to the fact that there is no risk that the information processing apparatus IPE2 may erroneously operate. For example, the control device CNT2 issues, to the processor CPU2, a restart interrupt request to instruct the processor CPU2 to restart the arithmetic processing and thereby notifies the processor CPU2 of the stop of the vibration caused by the earthquake. For example, the processor CPU2 recovers from the interrupt process routine and thereby restarts the stopped arithmetic processing in response to the restart interrupt request.

By restarting the arithmetic processing of the processors CPU1 and CPU2 in steps S16 and S23, the information processing system SYS1 may quickly restart information processing executed before the detection of the vibration caused by the earthquake. If vibration occurs due to an earthquake for a long time, the cable CBL is disconnected from the connector CN1 (or the connector CN2), and the connectors CN1 and CN2 are disconnected from each other, it is difficult for the information processing system SYS1 to be restored to a state before the occurrence of the vibration. The information processing apparatuses IPE1 and IPE2, however, are able to independently operate and detect the disconnection between the connectors CN1 and CN2. Thus, for example, the information processing system SYS1 may notify an external of the disconnection between the connectors CN1 and CN2 and promote a system administrator or the like to restore the information processing system SYS1 from the failure.

Figure 4:
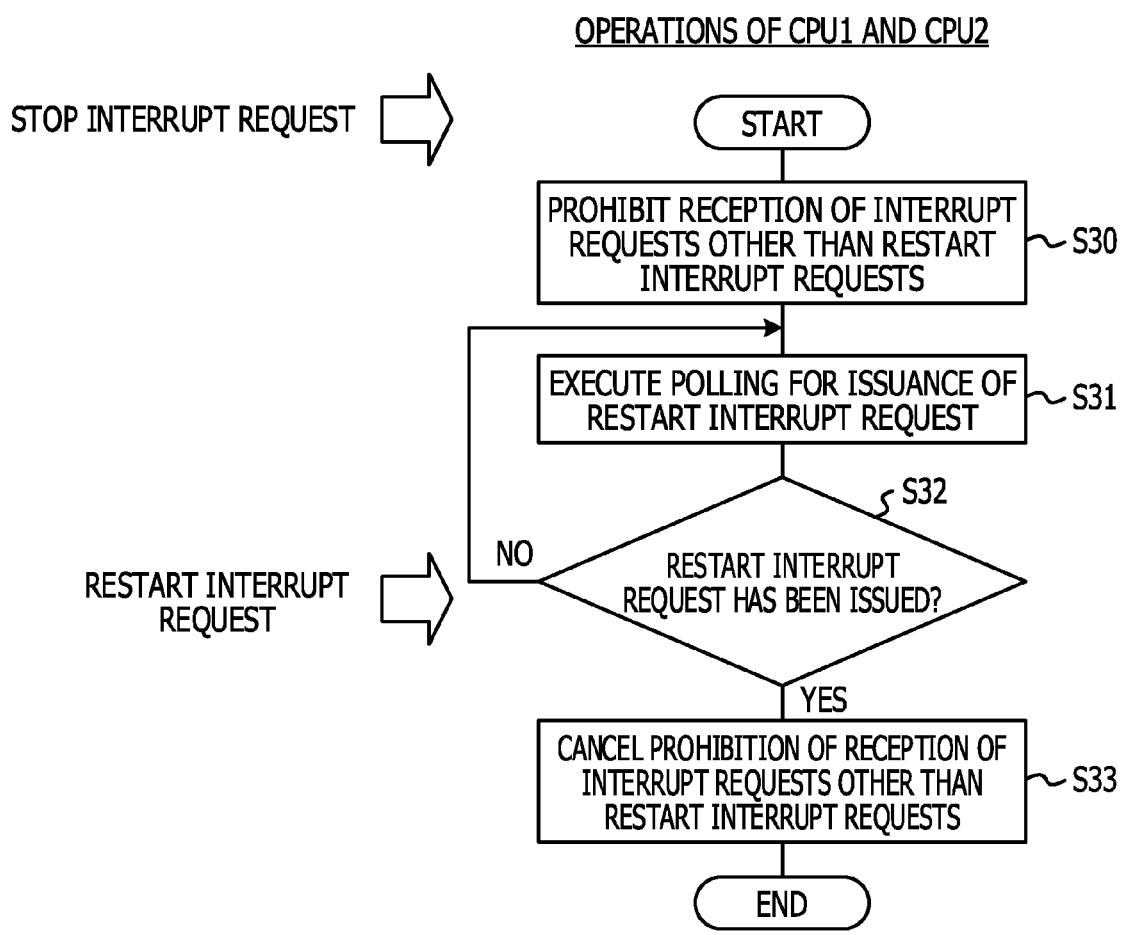
FIG. 4 is a diagram illustrating an example of operations of processors illustrated in FIG. 1.

FIG. 4 illustrates an example of operations of the processors CPU1 and CPU2 illustrated in FIG. 1. An overall process illustrated in FIG. 4 is achieved by causing the processors CPU1 and CPU2 to execute a program. Specifically, FIG. 4 illustrates the embodiment of the method for controlling the information processing system and the program for controlling the information processing system. In the process illustrated in FIG. 4, the operations of the processors CPU1 are the same as or similar to the operations of the processor CPU2. Thus, an example of the operations of the processor CPU1 is described below.

First, in step S30, the processor CPU1 that has received a stop interrupt request prohibits the reception of interrupt requests other than restart interrupt requests. Next, in step S31, the processor CPU1 executes polling for issuance of a restart interrupt request. Next, in step S32, the processor CPU1 determines, based on a result of the polling, whether or not the restart interrupt request has been issued. If the restart interrupt request has been issued, the process proceeds to step S33. If the restart interrupt request has not been issued, the process returns to step S31 and the polling is repeated.

In step S33, the processor CPU1 cancels the prohibition of the reception of the interrupt requests other than the restart interrupt requests. Then, the processor CPU1 recovers from the interrupt process routine (illustrated in FIG. 4) to the arithmetic processing executed before the interruption. Specifically, the processor CPU1 restarts the stopped arithmetic processing.

In the embodiment described with reference to FIGS. 1 to 4, the processor CPU1 may stop the executed arithmetic processing based on the instruction provided by the control device CNT1 due to the occurrence of the earthquake. In addition, the processor CPU2 may stop the executed arithmetic processing based on the instruction provided by the control device CNT1 that has received the notification representing the occurrence of the earthquake from the information processing apparatus IPE1. The information processing apparatus IPE1 wirelessly communicates with the information processing apparatus IPE2 so as to notify the information processing apparatus IPE2 of the occurrence of the earthquake. Thus, for example, even if a signal is not normally transmitted between the connectors CN1 and CN2 due to the vibration caused by the earthquake, the processor CPU2 may stop the executed arithmetic processing based on the magnitude of the vibration detected by the detector SNS1 included in the information processing apparatus IPE1.

During the vibration caused by the earthquake, the processors CPU1 and CPU2 temporarily stop the arithmetic processing and stand by until the stop of the vibration caused by the earthquake without executing anything. Thus, when the vibration caused by the earthquake stops and there is no risk that the information processing apparatuses IPE1 and IPE2 may erroneously operate, the processors CPU1 and CPU2 are able to restart the stopped arithmetic processing and continue the arithmetic processing executed before the occurrence of the earthquake. In addition, even when signal noise occurs due to a failure, caused by the vibration caused by the earthquake, of the connection between the connectors CN1 and CN2 or the like, the arithmetic processing is already stopped and thus an erroneous operation such as erroneous communication is not executed in the information processing system SYS1. Furthermore, after the restart of the arithmetic processing, information may not be transmitted between the information processing apparatuses IPE1 and IPE2 due to the connectors CN1 and CN2 disconnected due to the vibration caused by the earthquake. In this case, the information processing apparatuses IPE1 and IPE2 may detect a disconnection between the information processing apparatuses IPE1 and IPE2 during the restarted arithmetic processing.

For example, as illustrated in FIG. 3, when detecting the stop of the vibration caused by the earthquake, the control device CNT1 causes the processor CPU1 to restart the arithmetic processing and causes the communication device COM1 to notify the control device CNT2 of the stop of the vibration caused by the earthquake. The control device CNT2 causes the processor CPU2 to restart the arithmetic processing based on the notification. Thus, the information processing system SYS1 may continuously execute the arithmetic processing executed before the occurrence of the earthquake. On the other hand, if the information processing system SYS1 is shut down due to the occurrence of the earthquake, the information processing system SYS1 is rebooted after the stop of the vibration caused by the earthquake and it is therefore difficult to continue the suspended arithmetic processing.

The information processing apparatuses IPE1 and IPE2 temporarily stop the arithmetic processing executed by the processors CPU1 and CPU2 due to the occurrence of the earthquake, but do not execute the shutdown process. For example, the shutdown process is executed after the stop of the vibration caused by the earthquake. Since the shutdown process is executed after the stop of the vibration caused by the earthquake, the shutdown process may be normally terminated and a failure of a hard disk drive that is accessed during the shutdown process and the like may be avoided. On the other hand, if the shutdown process is executed during the vibration caused by the earthquake, there is a risk that the shutdown process may not be normally executed due to a failure, caused by the vibration or the like, of the connection between the connectors. In addition, there is a risk that the hard disk drive that is accessed during the shutdown process or the like may fail. Furthermore, if the shutdown process is not normally executed, there is a risk that it may be difficult to reboot the information processing apparatuses IPE1 and IPE2.

Thus, in the embodiment described with reference to FIGS. 1 to 4, a reduction in the reliability of the information processing system SYS may be suppressed.

In addition, if the magnitude of the vibration caused by the earthquake is equal to or larger than the threshold, the control device CNT1 issues the stop interrupt request to the processor CPU1, causes the processor CPU1 to stop the arithmetic processing. When the vibration caused by the earthquake stops, the control device CNT1 issues the restart interrupt request to the processor CPU1 and causes the processor CPU1 to restart the arithmetic processing. Similarly, if the magnitude of the vibration caused by the earthquake is equal to or larger than the threshold, the control device CNT2 issues the stop interrupt request to the processor CPU2 and causes the processor CPU2 to stop the arithmetic processing. When the vibration caused by the earthquake stops, the control device CNT2 issues the restart interrupt request to the processor CPU2 and causes the processor CPU2 to restart the arithmetic processing. The control devices CNT1 and CNT2 may easily control the stop and restart of the arithmetic processing by using the interrupt requests, compared with other methods.

The information processing apparatus IPE2 may stop the arithmetic processing upon the occurrence of an earthquake and restart the arithmetic processing upon the stop of the earthquake without using the detector SNS1. Thus, a configuration of the information processing apparatus IPE2 may be simplified, compared with a case where the information processing apparatus IPE2 includes the detector SNS1.

Figure 5:
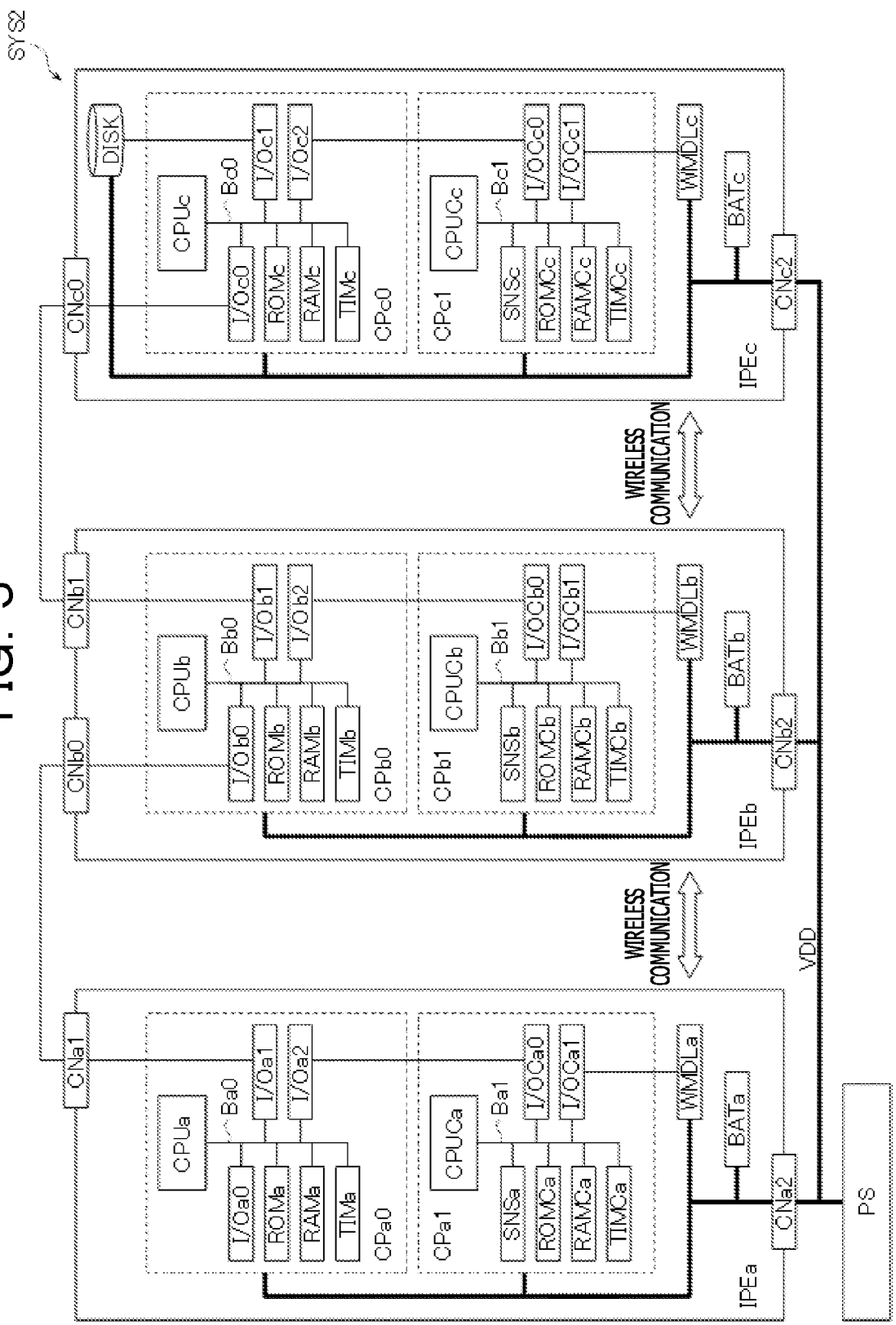
FIG. 5 is a diagram illustrating another embodiment of the information processing system.

FIG. 5 illustrates another embodiment of the information processing system. An information processing system SYS2 according to the other embodiment includes information processing apparatuses IPEa, IPEb, and IPEc and a power supply device PS configured to supply power to the information processing apparatuses IPEa, IPEb, and IPEc. The power supply device PS is an example of an external power supply. For example, the information processing system SYS2 is a computer system such as a server. For example, the information processing apparatuses IPEa, IPEb, and IPEc are mounted in a single rack or may be mounted in different racks. For example, the power supply device and at least one of the information processing apparatus IPEa, IPEb, and IPEc are mounted in the same rack.

The information processing apparatus IPEa includes controllers CPa0 and CPa1, a wireless module WMDLa, a battery BATa, and connectors CNa1 and CNa2. The information processing apparatus IPEb includes controllers CPb0 and CPb1, a wireless module WMDLb, a battery BATb, and connectors CNb0, CNb1, and CNa2. The information processing apparatus IPEc includes controllers CPc0 and CPc1, a disk device DISK, a wireless module WMDLc, a battery BATc, and connectors CNc0 and CNc2. Similarly to the sockets SCKT illustrated in FIG. 1, sockets are attached to both ends of a cable connecting the connectors CNa1 and CNb0 to each other, and sockets are attached to both ends of a cable connecting the connectors CNb1 and CNc0 to each other. In addition, similarly to the sockets SCKT illustrated in FIG. 1, sockets are attached to ends of a power supply cable VDD connected to the connectors CNa2, CNb2, and CNc2.

For example, the information processing apparatus IPEa has a mother board and a control function of causing the information processing system SYS2 to work as a server. For example, the controllers CPa0 and CPa1 designed as semiconductor chips, the wireless module WMDLa, the battery BATa, and the connectors CNa1 and CNa2 are mounted on the mother board. In other words, the controllers CPa0 and CPa1, the wireless module WMDLa, the battery BATa, and the connectors CNa1 and CNa2 are mounted directly to a wiring pattern printed on the mother board or are mounted directly to through holes formed in the mother board. Even if the parts that are mounted directly to the wiring pattern printed on the mother board or are mounted to the through holes formed in the mother board receive vibration caused by an earthquake, electric connections between the mother board and the parts are maintained and a connection failure or the like does not occur. On the other hand, there is a risk that a connection failure of a cable connecting the connectors CNa1 and CNa2 to each other or the like may occur between the connectors CNa1 and CNa2 due to the vibration caused by the earthquake.

The controller CPa0 includes a processor CPUa such as a CPU, interface units I/Oa0, I/Oa1, and I/Oa2, memories ROMa and RAMa, and a timer TIMa. The processor CPUa is connected to the interface units I/Oa0, I/Oa1, and I/Oa2, the memories ROMa and RAMa, and the timer TIMa through a bus Ba0. The processor CPUa is an example of an arithmetic processing apparatus configured to execute arithmetic processing.

The interface unit I/Oa1 is connected to the information processing apparatus IPEb through the connector CNa1. The connector CNa1 may be a slot to which the card-shaped information processing apparatus IPEb is attached. In this case, the connector CNb0 of the information processing apparatus IPEb serves as a contact arranged at an end of the card.

The interface unit I/Oa2 is connected to the controller CPa1 through a wiring mounted on the mother board. For example, the memory ROMa is a read only memory (ROM) and stores a program for causing the processor CPUa to execute arithmetic processing. For example, the memory RAMa is a random access memory (RAM) and temporarily stores data to be used for the arithmetic processing to be executed by the processor CPUa and the like. The timer TIMa operates based on an instruction provided by the processor CPUa and measures time. The controller CPa0 may include a plurality of timers TIMa.

The controller CPa1 includes a processor CPUCa such as a CPU, a sensor SNSa, interface units I/OCa0 and I/OCa1, memories ROMCa and RAMCa, and a timer TIMCa. The processor CPUCa is connected through a bus Ba1 to the interface units I/OCa0 and I/OCa1, the memories ROMCa and RAMCa, and the timer TIMCa. For example, the sensor SNSa is an acceleration sensor and is an example of a detector configured to detect the magnitude of vibration, caused by an earthquake or the like, of the information processing apparatus IPEa. The processor CPUCa is an example of a control device configured to control the execution of arithmetic processing by the processor CPUa based on the vibration caused by the earthquake and detected by the sensor SNSa and notify the information processing apparatuses IPEb and IPEc of the occurrence of the earthquake.

The interface unit I/OCa0 is connected to the interface unit I/Oa2 of the controller CPa0 through the wiring printed on the mother board. The interface unit I/OCa1 is connected to the wireless module WMDLa through a wiring printed on the mother board. For example, the memory ROMCa is a ROM and stores a program to be executed by the processor CPUCa. For example, the memory RAMCa is a RAM and temporarily stores data to be used by the processor CPUCa and the like.

The wireless module WMDLa wirelessly communicates with the wireless modules WMDLb and WMDLc of the other information processing apparatuses IPEb and IPEc based on control by the processor CPUCa. The wireless module WMDLa is an example of a communication device. The battery BATa accumulates power supplied from the power supply device PS through the connector CNa2. If the supply of the power from the power supply device PS is interrupted, the battery BATa supplies the accumulated power to the controllers CPa0 and CPa1 and the wireless module WMDLa. Thus, even if the power supply device PS is momentary disconnected from the connector CNa2 due to vibration caused by an earthquake, the information processing apparatus IPEa is able to operate with the power accumulated in the battery BATa. For example, the battery BATa has a sufficient capacity to enable the information processing apparatus IPEa to operate for a time period (of, for example, approximately 10 minutes) until vibration that is caused by an earthquake and of which the magnitude is equal to or larger than the threshold stops. In FIG. 5, solid lines represent power supply lines VDD or power supply cables VDD.

The processor CPUa executes a program and thereby executes information processing so as to process data provided to the information processing system SYS2 or the like. In addition, if the magnitude of vibration caused by an earthquake and detected by the sensor SNSa is equal to or larger than the threshold, the processor CPUCa stops an operation of the processor CPUa and notifies the other information processing apparatuses IPEb and IPEc of the occurrence of the earthquake through the wireless module WMDLa.

For example, the information processing apparatus IPEc functions as a storage device that is accessed by the information processing apparatus IPEa. For example, the disk device DISK is a hard disk drive including a magnetic disk or is a solid state drive (SSD) including a flash memory. For example, the information processing apparatus IPEb functions as a controller configured to control an operation of the information processing apparatus IPEc based on an instruction provided by the information processing apparatus IPEa.

The controller CPb0 of the information processing apparatus IPEb has the same configuration as the controller CPa0 of the information processing apparatus IPEa except that the interface unit I/Ob0 is connected to the connector CNb0. The controller CPb1 of the information processing apparatus IPEb has a configuration that is the same as or similar to the controller CPa1 of the information processing apparatus IPEa. The controllers CPb0 and CPb1, the wireless WMDLb, the battery BATb, and the connectors CNb0, CNb1, and CNb2 are mounted directly to a wiring pattern printed on a printed circuit board included in the information processing apparatus IPEb or are mounted directly to through holes formed in the printed circuit board included in the information processing apparatus IPEb. Elements of the controllers CPb0 and CPb1 are represented by replacing symbols "a" of the elements of the controllers CPa0 and CPa1 with symbols "b".

The controller CPc0 of the information processing apparatus IPEc has the same configuration as the controller CPa0 of the information processing apparatus IPEa except that the interface unit I/Oc0 is connected to the connector CNc0 and that the interface unit I/Oc1 is connected to the disk device DISK. The controller CPc1 of the information processing apparatus IPEc has a configuration that is the same as or similar to the controller CPa1 of the information processing apparatus IPEa. Elements of the controllers CPc0 and CPc1 are represented by replacing the symbols "a" of the elements of the controllers CPa0 and CPa1 with symbols "c". For example, the disk device DISK, the wireless module WMDLc, and the battery BATc are mounted directly on a printed circuit board on which the controllers CPc0 and CPc1 are mounted. In other words, the controllers CPc0 and CPc1, the disk device DISK, the wireless module WMDLc, the battery BATc, and the connectors CNc0 and CNc2 are mounted directly to a wiring pattern printed on the printed circuit board included in the information processing apparatus IPEc or are mounted directly to through holes in the printed circuit board included in the information processing apparatus IPEc.

If the disk device DISK of the information processing apparatus IPEc is able to be accessed directly by the information processing apparatus IPEa, the connector CNa1 of the information processing apparatus IPEa may be connected to the connector CNc0 of the information processing apparatus IPEc. In this case, the information processing system SYS2 does not include the information processing apparatus IPEb.

In the information processing apparatus IPEa, power supply lines that are wired between the connector CNa2, the controllers CPa0 and CPa1, the wireless module WMDLa, and the battery BATa form a power supply pattern printed on the mother board. Thus, even if an earthquake occurs, connections that are formed by the power supply lines wired between the connector CNa2, the controllers CPa0 and CPa1, the wireless module WMDLa, and the battery BATa are maintained.

On the other hand, the connection between the connectors CNa1 and CNb0 and the connection between the connector CNa2 and the power supply device PS may be momentary interrupted due to vibration caused by an earthquake. However, even if the connection between the connectors CNa1 and CNb0 is momentary interrupted, the information processing apparatus IPEa may wirelessly communicate with the information processing apparatuses IPEb and IPEc so as to exchange information with the information processing apparatuses IPEb and IPEc. In addition, even if the connection between the connector CNa2 and the power supply device PS is momentary interrupted, the battery BATa supplies power to the controllers CPa0 and CPa1 and the wireless module WMDLa.

Similarly, in the information processing apparatus IPEb, power supply lines that are wired between the connector CNb2, the controllers CPb0 and CPb1, the wireless module WMDLb, and the battery BATb form a power supply pattern printed on the printed circuit board. Thus, even if an earthquake occurs, connections that are formed by the power supply lines connecting the connector CNb2, the controllers CPb0 and CPb1, the wireless module WMDLb, and the battery BATb to each other are maintained.

On the other hand, the connection between the connectors CNb1 and CNc0 and the connection between the connector CNb2 and the power supply device PS may be momentary interrupted due to vibration caused by an earthquake. However, even if the connection between the connectors CNb1 and CNc0 is momentary interrupted, the information processing apparatus IPEb may wirelessly communicate with the information processing apparatuses IPEa and IPEc so as to exchange information with the information processing apparatuses IPEa and IPEc. In addition, even if the connection between the connector CNb2 and the power supply device PS is momentary interrupted, the battery BATb supplies power to the controllers CPb0 and CPb1 and the wireless module WMDLb.

In the information processing apparatus IPEc, power supply lines that are wired between the connector CNc2, the controllers CPc0 and CPc1, the disk device DISK, the wireless module WMDLc, and the battery BATc form a power supply pattern printed on the printed circuit board. Thus, connections that are formed by the power supply lines connecting the connector CNc2, the controllers CPc0 and CPc1, the disk device DISK, the wireless module WMDLc, and the battery BATc to each other are maintained.

On the other hand, the connection between the connector CNc2 and the power supply device PS may be momentary interrupted due to vibration caused by an earthquake. However, even if the connection between the connector CNc2 and the power supply device PS is momentary interrupted, the battery BATc supplies power to the controllers CPb0 and CPb1, the disk device DISK, and the wireless module WMDLb.

Figure 6:
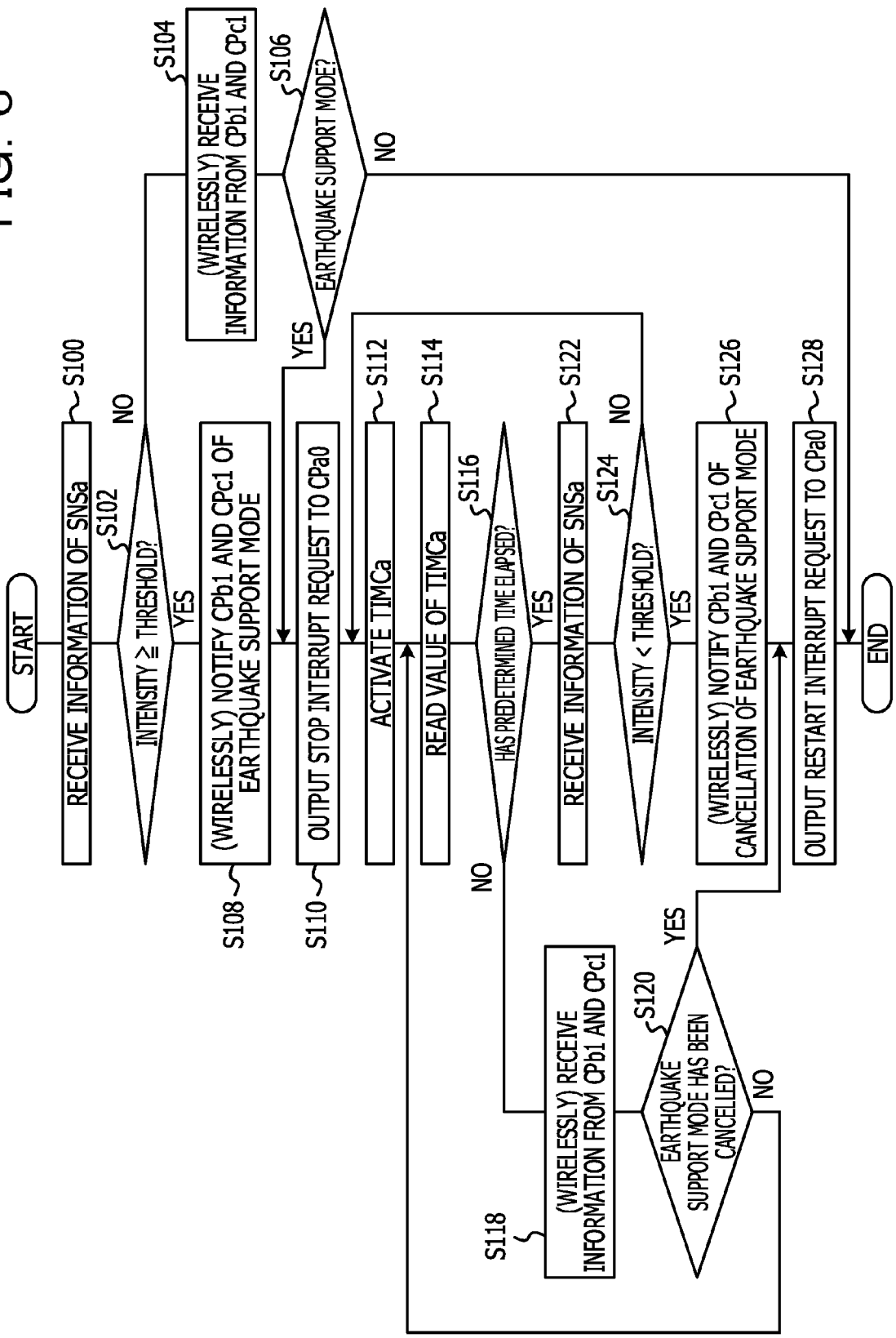
FIG. 6 is a diagram illustrating an example of operations of a controller illustrated in FIG. 5.

FIG. 6 illustrates an example of operations of the controller CPa1 illustrated in FIG. 5. An overall process illustrated in FIG. 6 is achieved by causing the processor CPUCa of the controller CPa1 to execute a program stored in the memory ROMCa.

Operations of the controllers CPb1 and CPc1 are similar to operations illustrated in FIG. 6. The operations of the controller CPb1 are achieved by replacing symbols "a" illustrated in FIG. 6 and symbols "a" described below with reference to FIG. 6 with symbols "b" and replacing symbols "b" illustrated in FIG. 6 and symbols "b" described below with reference to FIG. 6 with symbols "a". In this case, the process illustrated in FIG. 6 is achieved by causing the processor CPUCb of the controller CPb1 to execute a program stored in the memory ROMCb.

In addition, the operations of the controller CPc1 are achieved by replacing the symbols "a" illustrated in FIG. 6 and the symbols "a" described below with reference to FIG. 6 with symbols "c" and replacing symbols "c" illustrated in FIG. 6 and symbols "c" described below with reference to FIG. 6 with symbols "a". In this case, the process illustrated in FIG. 6 is achieved by causing the processor CPUCc of the controller CPc1 to execute a program stored in the memory ROMCc.

Specifically, FIG. 6 illustrates the other embodiment of the method for controlling the information processing system and the program for controlling the information processing system. The operations of the controller CPa1 may be achieved by causing a logical circuit of the controller CPa1 to operate. The operations of the controller CPb1 may be achieved by causing a logical circuit of the controller CPb1 to operate. The operations of the controller CPc1 may be achieved by causing a logical circuit of the controller CPc1 to operate.

The process illustrated in FIG. 6 is activated by the controller CPa1 at intervals of several milliseconds to several tens of milliseconds during the time when the information processing system SYS2 is in a normal mode, for example. The normal mode is a mode in which the information processing system SYS2 executes a function as the server. The normal mode is set for each of the information processing apparatuses IPEa, IPEb, and IPEc. When the magnitude of vibration caused by an earthquake is equal to or larger than the threshold, the information processing apparatuses IPEa, IPEb, and IPEc transition from the normal mode to an earthquake support mode. When the magnitude of the vibration caused by the earthquake becomes smaller than the threshold, the information processing apparatuses IPEa, IPEb, and IPEc transition from the earthquake support mode to the normal mode.

First, in step S100, the controller CPa1 receives information on vibration detected by the sensor SNSa. For example, the controller CPa1 converts the magnitude of the vibration detected by the sensor SNSa into the seismic intensity of an earthquake.

Next, in step S102, the controller CPa1 determines whether or not the converted seismic intensity is equal to or larger than a set threshold. For example, the threshold is set to a seismic intensity 5, 250 Gal (seismic intensity 5 upper), or the like. If the magnitude of the vibration is equal to or larger than the threshold, the process proceeds to step S108. If the magnitude of the vibration is smaller than the threshold, the process proceeds to step S104.

Similarly to the embodiment described with reference to FIGS. 1 to 4, if vibration of which the magnitude is equal to or larger than the threshold occurs at the rack, there is a risk that contact resistance of a contact point of a signal line between the connectors CNa1 and CNb0 or between the connectors CNb1 and CNc0 may change or the signal line may be momentary disconnected. The change of contact resistance or the disconnection may cause noise in a signal transmitted through the connectors CNa1, CNb0, CNb1, and CNc0 or may temporarily interrupt the transmission of the signal, and there is a risk that the information processing apparatuses IPEa, IPEb, and IPEc may erroneously operate. In addition, if vibration of which the magnitude is large continues for a long time, there is a risk that the connectors CNa1 and CNb0 may be disconnected from each other or the connectors CNb1 and CNc0 may be disconnected from each other. Even if it is difficult to transmit a signal between the connectors CNa1 and CNb0 or between the connectors CNb1 and CNc0, the controllers CPa1, CPb1, and CPc1 may wirelessly communicate with each other.

In step S104, the controller CPa1 receives information on the earthquake through the wireless module WMDLa from the controller CPb1 of the information processing apparatus IPEb and the controller CPc1 of the information processing apparatus IPEc.

In step S106, the controller CPa1 determines, based on the information received in step S104, whether or not at least one of the controllers CPb1 and CPc1 is in the earthquake support mode. If at least one of the controllers CPb1 and CPc1 is in the earthquake support mode, the process proceeds to step S110. If the controllers CPb1 and CPc1 are not in the earthquake support mode (or are in the normal mode), the process is terminated.

In step S108, the controller CPa1 transitions to the earthquake support mode from the normal mode and notifies, through the wireless module WMDLa, the controllers CPb1 and CPc1 of the transition to the earthquake support mode.

Figure 7:
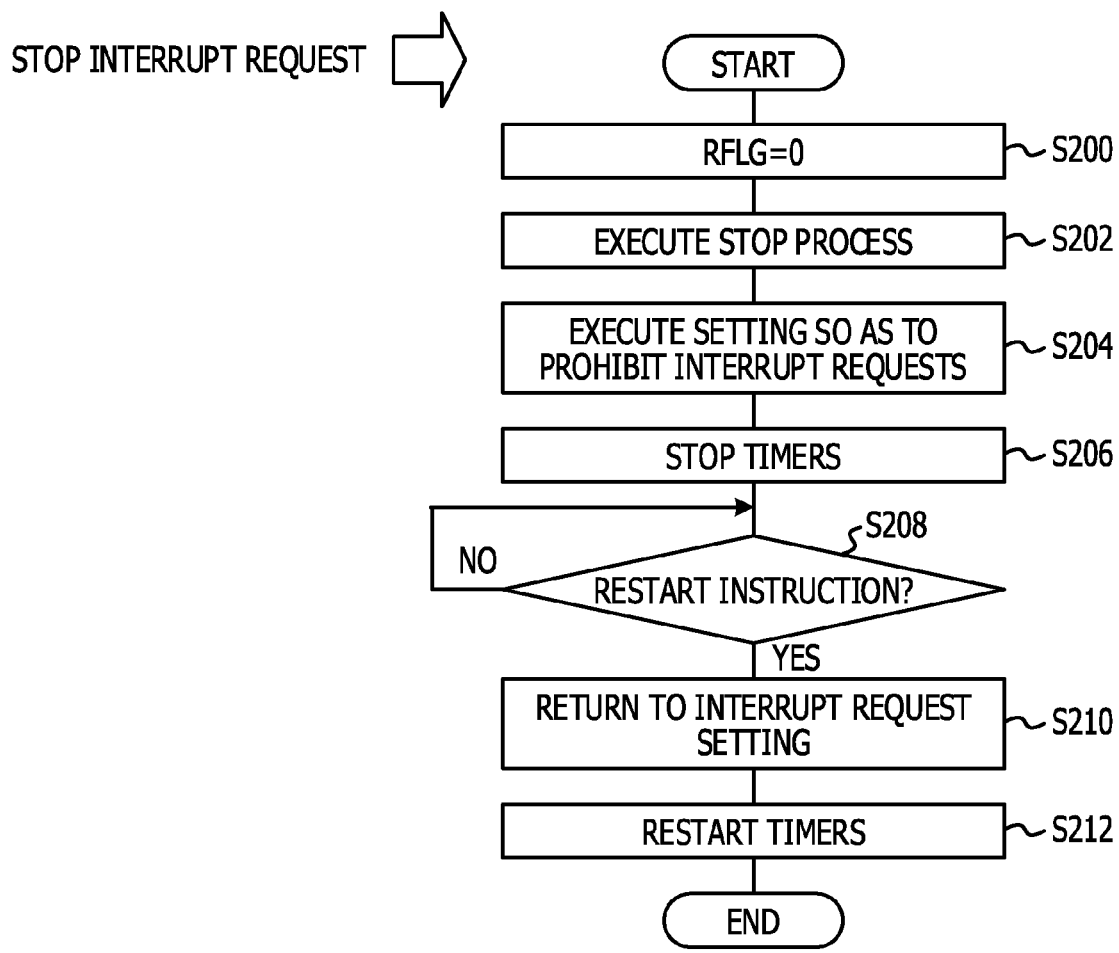
FIG. 7 is a diagram illustrating an example of operations of controllers that have received a stop interrupt request illustrated in FIG. 6.

Next, in step S110, the controller CPa1 outputs, to the controller CPa0, a stop interrupt request to stop an operation of the controller CPa0. This is due to the fact that there is a risk that the information processing apparatus IPEa may erroneously operate. For example, the stop interrupt request is transmitted from the processor CPUCa through the interface units I/OCa0 and I/Oa2 to the processor CPUa. An example of operations of the processor CPUa that has received the stop interrupt request is illustrated in FIG. 7.

Next, in step S112, the controller CPa1 activates the timer TIMCa. In step S114, the controller CPa1 reads a value of the timer TIMCa. In step S116, the controller CPa1 determines, based on the value of the timer TIMCa, whether or not a predetermined time has elapsed. For example, the predetermined time is set to a time in a range from several tens of seconds to several minutes. If the predetermined time has elapsed, the process proceeds to step S122. If the predetermined time has yet to elapse, the process proceeds to step S118.

In step S118, the controller CPa1 receives information on the earthquake from the controllers CPb1 and CPc1 through the wireless module WMDLa. Next, in step S120, the controller CPa1 determines, based on the information received in step S118, whether or not the controllers CPb1 and CPc1 have cancelled the earthquake support mode and returned to the normal mode. If both controllers CPb1 and CPc1 have cancelled the earthquake support mode, the process proceeds to step S128. If at least one of the controllers CPb1 and CPc1 is in the earthquake support mode, the process returns to step S114. If the information processing system SYS2 does not include the information processing apparatus IPEb and the controller CPc1 has cancelled the earthquake support mode, the process proceeds to step S128. If the information processing system SYS2 does not include the information processing apparatus IPEb and the controller CPc1 is in the earthquake support mode, the process returns to step S114.

On the other hand, if a time measured by the timer TIMCa exceeds the predetermined time, the controller CPa1 receives information of the vibration detected by the sensor SNSa in step S122. For example, the controller CPa1 converts the magnitude of the vibration detected by the sensor SNSa into the seismic intensity of the earthquake.

Next, in step S124, the controller CPa1 determines whether or not the converted seismic intensity is smaller than the set threshold. If the seismic intensity is smaller than the threshold, the process proceeds to step S126. If the seismic intensity is equal to or larger than the threshold, the process returns to step S112 and the timer TIMCa is reactivated.

Figure 8:
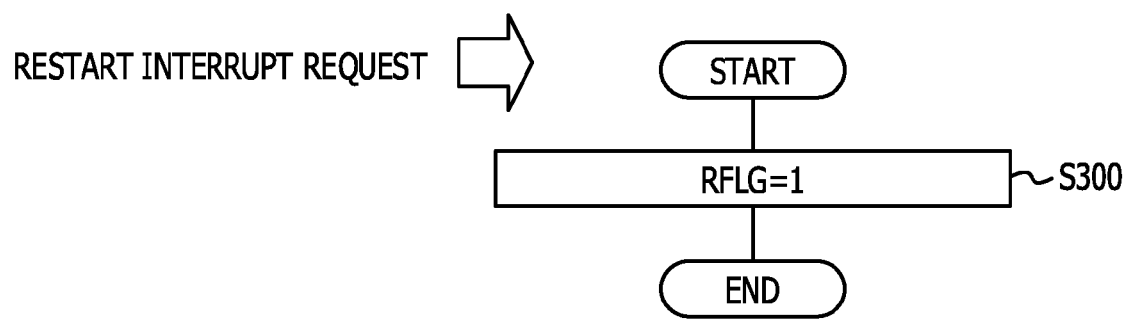
FIG. 8 is a diagram illustrating an example of operations of the controllers that have received a restart interrupt request illustrated in FIG. 6.

In step S126, the controller CPa1 notifies the controllers CPb1 and CPc1 of the cancellation of the earthquake support mode through the wireless module WMDLa. Next, in step S128, the controller CPa1 outputs, to the controller CPa0, a restart interrupt request to restart the stopped operation of the controller CPa0. This is due to the fact that there is no risk that the information processing apparatus IPEa may erroneously operate. For example, the restart interrupt request is transmitted from the processor CPUCa through the interface units I/OCa0 and I/Oa2 to the processor CPUa. An example of an operation of the processor CPUa that has received the restart interrupt request is illustrated in FIG. 8.

FIG. 7 illustrates an example of operations of the controllers CPa0, CPb0, and CPc0 that have received the stop interrupt request illustrated in FIG. 6. An overall process illustrated in FIG. 7 is achieved by causing the processor CPUa included in the controller CPa0 to execute a program stored in the memory ROMa and is achieved by causing the processor CPUb included in the controller CPb0 to execute a program stored in the memory ROMb. In addition, the process illustrated in FIG. 7 is achieved by causing the processor CPUc included in the controller CPc0 to execute a program stored in the memory ROMc. Specifically, FIG. 7 illustrates an example of the method for controlling the information processing system and the program for controlling the information processing system.

Since operations of the controllers CPb0 and CPc0 that have received the stop interrupt request are similar to the operations illustrated in FIG. 7, operations of the controller CPa0 are described below. The operations of the controller CPb0 are achieved by replacing symbols "a" described below with reference to FIG. 7 with symbols "b", while the operations of the controller CPc0 are achieved by replacing the symbols "a" described below with reference to FIG. 7 with symbols "c".

In step S200, the controller CPa0 that has received the stop interrupt request resets a restart flag RFLG to "0". For example, the restart flag RFLG is set in a register included in the processor CPUa or is set in the memory RAMa.

Next, in step S202, the controller CPa0 executes a process of stopping an operation that is among operations currently executed in the information processing apparatus IPEa and is affected by vibration caused by an earthquake. For example, if the controller CPc0 receives the stop interrupt request during the time when the controller CPc0 accesses the disk device DISK, the controller CPc0 stops the access to the disk device DISK in step S202. For example, if the disk device DISK is a hard disk drive, the controller CPc0 causes a magnetic head to be retracted, causes a spindle to be stopped being rotated, and the like. If a part that is affected by the vibration caused by the earthquake does not exist, step S202 may be omitted.

Next, in step S204, the controller CPa0 executes setting so as to prohibit interrupt requests other than the restart interrupt requests. In step S206, the controller CPa0 stops various timers such as the timer TIMa. The timers instructed to be stopped hold timer values and become a holding state.

Next, in step S208, the controller CPa0 determines whether or not the restart flag RFLG is set to "1". The restart flag RFLG is set to "1" when the controller CPa0 receives the restart interrupt request as illustrated in FIG. 8. If the restart flag RFLG is set to "1", the process proceeds to step S210. If the restart flag RFLG is set to "0", the process repeats step S208.

If the restart flag RFLG is set to "1", the controller CPa0 returns to a state in which the controller CPa0 is able to receive the interrupt requests prohibited in step S204 in step S210. Next, in step S212, the controller CPa0 restarts operations of the various timers stopped in step S206. Then, the process of the controller CPa0 that has received the stop interrupt request is terminated.

If operations stopped by the controllers CPa0, CPb0, and CPc0 based on the restart interrupt request are restarted, various errors such as an error of a process executed based on time and a communication error may occur. These errors are relieved by a retry process executed by an operating system executed by the processors CPUa, CPUb, and CPUc or firmware executed by the processors CPUa, CPUb, and CPUc or the like. In addition, if the operating system or the firmware detects an error that makes recovery difficult, the operating system or the firmware notifies an external device of the error or executes the shutdown process. The shutdown process is executed after the stop of vibration caused by an earthquake and is therefore normally terminated.

FIG. 8 illustrates an example of operations of the controllers CPa0, CPb0, and CPc0 that have received the restart interrupt request. An overall process illustrated in FIG. 8 is achieved by causing the processor CPUa included in the controller CPa0 to execute a program stored in the memory ROMa and is achieved by causing the processor CPUb included in the controller CPb0 to execute a program stored in the memory ROMb. In addition, the process illustrated in FIG. 8 is achieved by causing the processor CPUc included in the controller CPc0 to execute a program stored in the memory ROMc. Specifically, FIG. 8 illustrates an example of the method for controlling the information processing system and the program for controlling the information processing system.

Since operations of the controllers CPb0 and CPc0 that have received the restart interrupt request are similar to an operation illustrated in FIG. 8, an operation of the controller CPa0 is described below. The operation of the controller CPb0 is achieved by replacing symbols "a" described below with reference to FIG. 8 with symbols "b", while the operation of the controller CPc0 is achieved by replacing the symbols "a" described below with reference to FIG. 8 with symbols "c".

In step S300, the controller CPa0 that has received the restart interrupt request sets the restart flag RFLG to "1". Then, the process of the controller CPa0 that has received the restart interrupt request is terminated.

In the embodiment described with reference to FIGS. 5 to 8, effects that are similar to the embodiment described with reference to FIG. 1 are obtained. Specifically, the processors CPUa, CPUb, and CPUc stop arithmetic processing based on the occurrence of an earthquake and stand by until the stop of vibration caused by the earthquake without executing anything. Thus, for example, even if the connection between the connector CNa1 and the information processing apparatus IPEa is momentary interrupted, an erroneous operation is not executed due to the occurrence of noise or the like. In addition, when an earthquake stops and there is no risk that an erroneous operation may be executed, the processors CPUa, CPUb, and CPUc may continue arithmetic processing executed before the occurrence of the earthquake. Since the shutdown process is not executed upon the occurrence of an earthquake, there is no risk that it may be difficult to restart the information processing apparatuses IPEa, IPEb, and IPEc. For example, if the connector CNa1 is disconnected from the information processing apparatus IPEa due to vibration caused by an earthquake, the information processing apparatus IPEa may detect interruption of the connection between the information processing apparatuses IPEa and IPEb during the restarted arithmetic processing. Thus, in the embodiment described with reference to FIGS. 5 to 8, a reduction in the reliability of the information processing system SYS2 may be suppressed. In addition, the stop and restart of the arithmetic processing may be easily controlled using the interrupt requests.

In addition, in the embodiment described with reference to FIGS. 5 to 8, the connections between the power supply device PS and the information processing apparatuses IPEa, IPEb, and IPEc may be momentary interrupted due to vibration caused by an earthquake. In this case, the information processing apparatuses IPEa, IPEb, and IPEc may be operated by the batteries BATa, BATb, and BATc. Specifically, the processes illustrated in FIGS. 6 to 8 may be normally executed, and a reduction in the reliability of the information processing system SYS2 may be suppressed.

Figure 9:
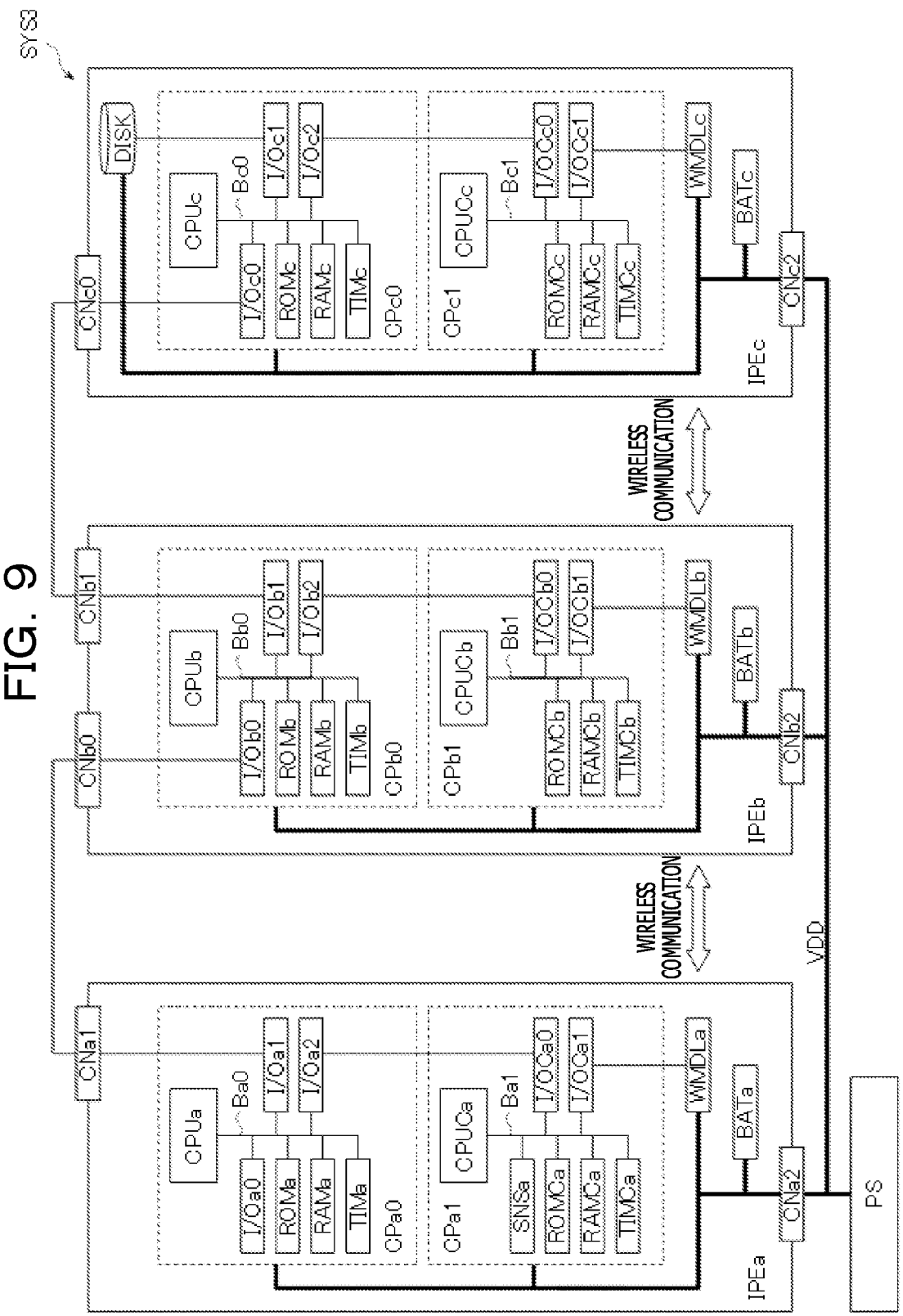
FIG. 9 is a diagram illustrating another embodiment of the information processing system.

FIG. 9 illustrates another embodiment of the information processing system and the method for controlling the information processing system. Elements that are the same as or similar to the elements described in the embodiment with reference to FIG. 5 and are illustrated in FIG. 9 are represented by the same reference symbols as those illustrated in FIG. 5, and a detailed description thereof is omitted. An information processing system SYS3 according to the embodiment has the same configuration as the information processing system SYS2 illustrated in FIG. 5 except that the controller CPb1 of the information processing apparatus IPEb does not have the sensor SNSb and the controller CPc1 of the information processing apparatus IPEc does not have the sensor SNSc in the information processing system SYS3. Specifically, the information processing system SYS3 is a computer system such as a server and includes the information processing apparatuses IPEa, IPEb, and IPEc and the power supply device PS configured to supply power to the information processing apparatuses IPEa, IPEb, and IPEc.

In the information processing system SYS3, the information processing apparatuses IPEa, IPEb, and IPEc transition from the normal mode to the earthquake support mode based on vibration caused by an earthquake and detected by the sensor SNSa included in the information processing apparatus IPEa. In the information processing system SYS3, the information processing apparatuses IPEa, IPEb, and IPEc transition from the earthquake support mode to the normal mode based on vibration caused by an earthquake and detected by the sensor SNSa included in the information processing apparatus IPEa.

Figure 10:
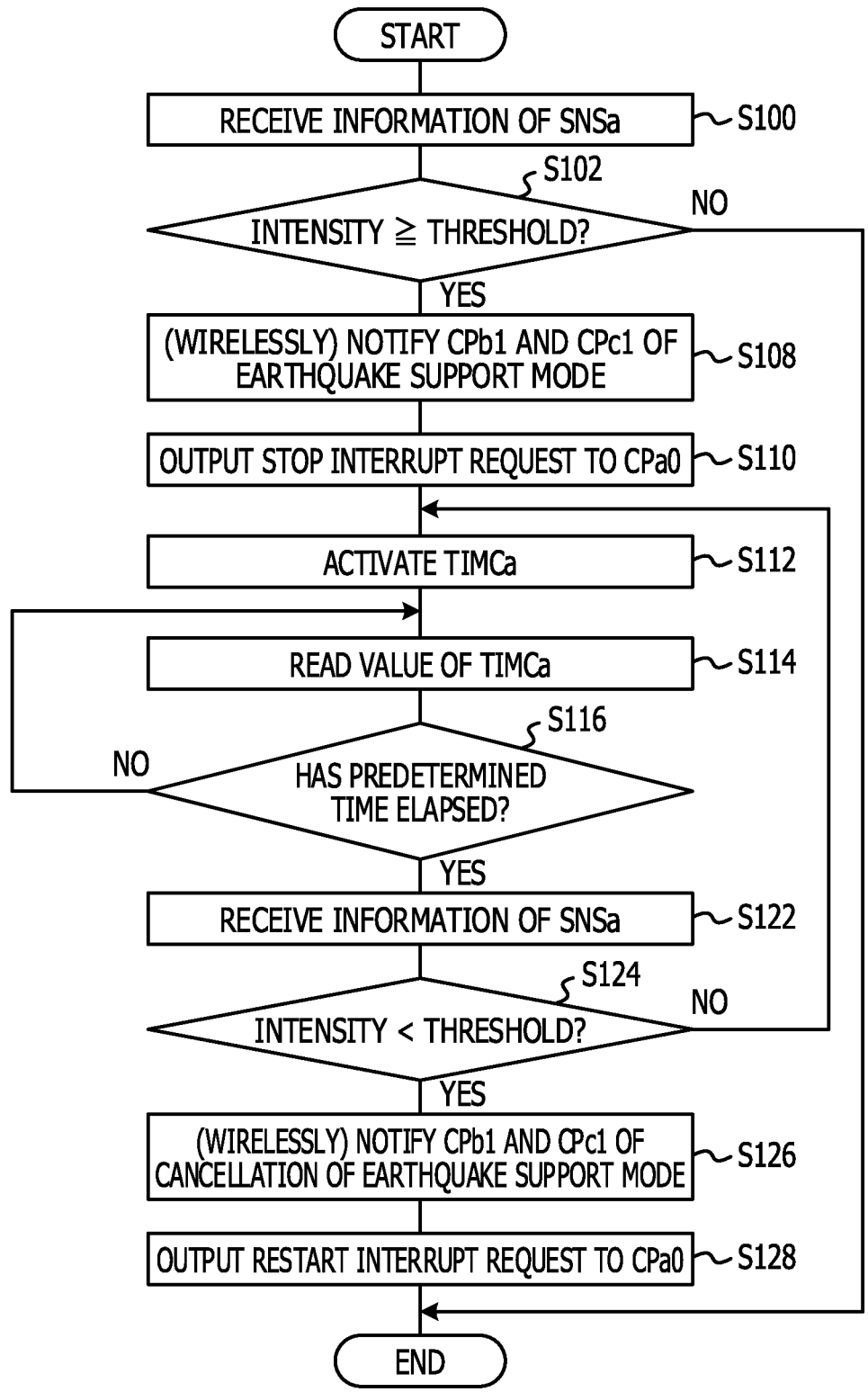
FIG. 10 is a diagram illustrating an example of operations of the controller illustrated in FIG. 9.

FIG. 10 illustrates an example of operations of the controller CPa1 illustrated in FIG. 9. Processes that are illustrated in FIG. 10 and are the same as or similar to the processes illustrated in FIG. 6 are represented by the same reference symbols as those illustrated in FIG. 6, and a detailed description thereof is omitted. An overall process illustrated in FIG. 10 is achieved by causing the controller CPa1 to execute a program stored in the memory ROMCa. Specifically, FIG. 10 illustrates the other embodiment of the method for controlling the information processing system and the program for controlling the information processing system. The operations of the controller CPa1 may be achieved by causing the logical circuit of the controller CPa1 to operate.

In the information processing system SYS3 illustrated in FIG. 9, the controller CPb1 does not have the sensor SNSb, the controller CPc1 does not have the sensor SNSc, and the controller CPa1 does not receive information on vibration caused by an earthquake from the controllers CPb1 and CPc1. The process illustrated in FIG. 10 does not include the processes of steps S104, S106, S118, and S120 illustrated in FIG. 6. Specifically, if the controller CPa1 determines that the seismic intensity of the earthquake is smaller than the threshold in step S102, the controller CPa1 terminates the process without receiving information from the controllers CPb1 and CPc1. In addition, if the predetermined time has yet to elapse in step S116, the controller CPa1 causes the process to return to step S114 without receiving information from the controllers CPb1 and CPc1. Other processes illustrated in FIG. 10 are the same as or similar to the processes illustrated in FIG. 6. An example of operations of the processor CPUa that has received the stop interrupt request is the same as or similar to the example illustrated in FIG. 7, while an example of an operation of the processor CPUa that has received the restart interrupt request is the same as or similar to the example illustrated in FIG. 8.

Figure 11:
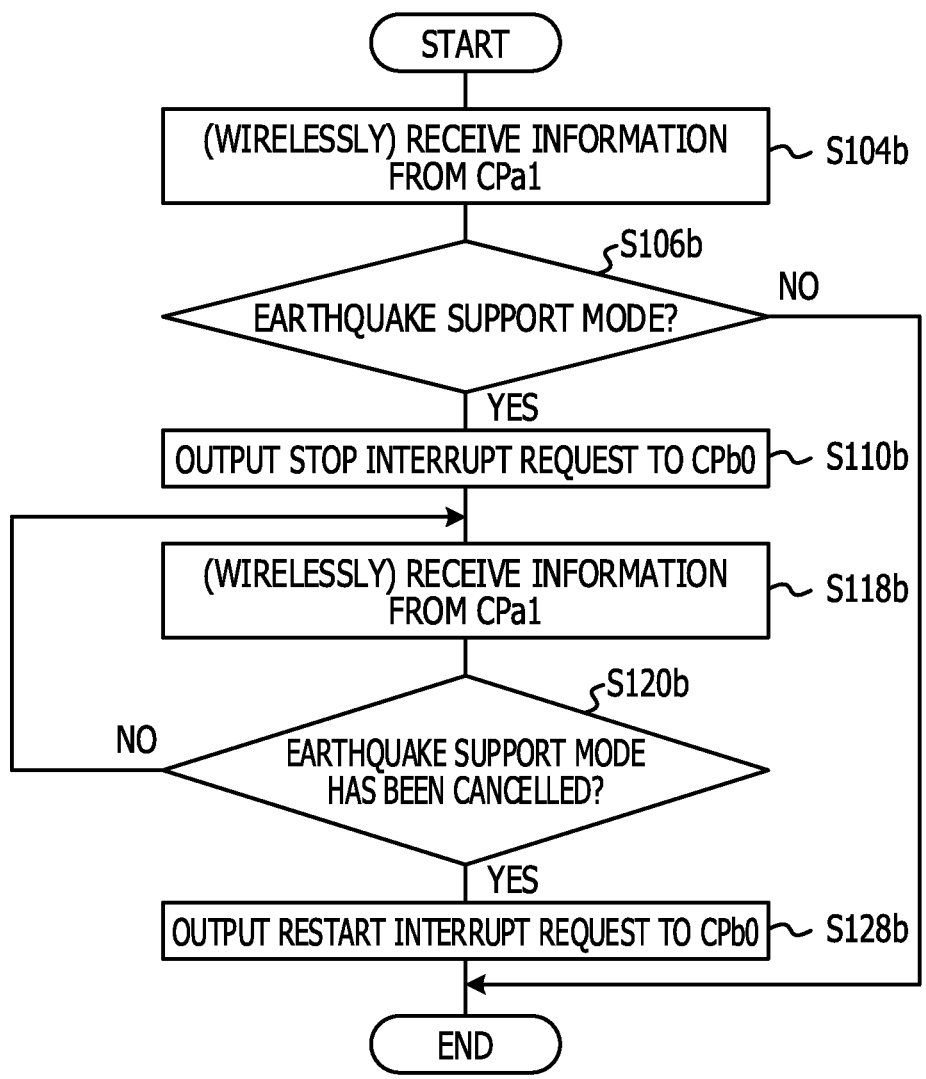
FIG. 11 is a diagram illustrating an example of operations of another controller illustrated in FIG. 9.

FIG. 11 illustrates an example of operations of the controller CPb1 illustrated in FIG. 9. Processes that are illustrated in FIG. 11 and are the same as or similar to the processes illustrated in FIG. 6 are represented by adding symbols "b" to the step numbers illustrated in FIG. 6, and a detailed description thereof is omitted. Specifically, processes of steps S104b, S106b, S110b, S118b, S120b, and S128b illustrated in FIG. 11 correspond to the processes of steps S104, S106, S110, S118, S120, and S128. An overall process illustrated in FIG. 11 is achieved by causing the controller CPb1 to execute a program stored in the memory ROMCb. Specifically, FIG. 11 illustrates an example of the method for controlling the information processing system and the program for controlling the information processing system. Operations of the controller CPb1 may be achieved by causing the logical circuit of the controller CPb1 to operate. Operations of the controller CPc1 are similar to the operations illustrated in FIG. 11 and are achieved by replacing symbols "b" described below with reference to FIG. 11 with symbols "c", and a description thereof is omitted.

In the information processing system SYS3 illustrated in FIG. 9, the controller CPb1 that does not have the sensor SNSb, and the controller CPc1 that does not have the sensor SNSc, do not execute the processes related to the sensors SNSb and SNSc. In addition, the transition to the earthquake support mode by the controllers CPb1 and CPc1 and the cancellation of the earthquake support mode by the controllers CPb1 and CPc1 are executed in accordance with transition of an operational mode of the controller CPa1. Thus, the controllers CPb1 and CPc1 do not notify the other controllers such as the controller CPa1 of the transition to the earthquake support mode and the cancellation of the earthquake support mode. Thus, in the process illustrated in FIG. 11, processes that correspond to the processes of steps S100, S102, S108, S112, S114, S116, S122, S124, and S126 illustrated in FIG. 6 are not executed.

In step S104b, the controller CPb1 receives information on an earthquake from the controller CPa1 of the information processing apparatus IPEa through the wireless module WMDLb.

In step S106b, the controller CPb1 determines, based on the information received in step S104b, whether or not the controller CPa1 is in the earthquake support mode. If the controller CPa1 is in the earthquake support mode, the process proceeds to step S110b. If the controller CPa1 is not in the earthquake support mode (or is in the normal mode), the process is terminated.

In step S110b, the controller CPb1 outputs, to the controller CPb0, a stop interrupt request to stop an operation of the controller CPb0. This is due to the fact that there is a risk that the controller CPb0 may erroneously operate. For example, the stop interrupt request is transmitted from the processor CPUCb through the interface units I/OCb0 and I/Ob2 to the processor CPUb.

Next, in step S118b, the controller CPb1 receives information on the earthquake from the controller CPa1 through the wireless module WMDLb. Next, in step S120b, the controller CPb1 determines, based on the information received in step S118b, whether or not the controller CPa1 has cancelled the earthquake support mode and returned to the normal mode. If the controller CPa1 has cancelled the earthquake support mode, the process proceeds to step S128b. If the controller CPa1 is in the earthquake support mode, the process returns to step S118b.

In step S128b, the controller CPb1 outputs, to the controller CPb0, a restart interrupt request to restart the stopped operation of the controller CPb0. This is due to the fact that there is no risk that the controller CPb0 may erroneously operate. For example, the restart interrupt request is transmitted from the processor CPUCb through the interface units I/OCb0 and I/Ob2 to the processor CPUb. An example of operations of the processors CPUb and CPUc that have received a stop interrupt request is the same as or similar to the example illustrated in FIG. 7, while an example of operations of the processors CPUb and CPUc that have received a restart interrupt request is the same as or similar to the example illustrated in FIG. 8.

In the embodiment described with reference to FIGS. 9 to 11, a reduction in the reliability of the information processing system SYS3 may be suppressed, similarly to the embodiments described with reference to FIGS. 1 to 8. In addition, the configurations of the information processing apparatuses IPEb and IPEc may be simplified, compared with a case where the controllers CNTb1 and CNTb2 have the sensors SNSb and SNSc, respectively.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a first information processing apparatus including
a first processor,
a first detector configured to detect vibration,
a first communication device, and
a second processor coupled to the first detector and configured to cause the first processor to stop first data processing executed by the first processor when the vibration is detected by the first detector; and
a second information processing apparatus including
a third processor,
a second communication device configured to communicate with the first communication device, and
a fourth processor configured to cause the third processor to stop second data processing executed by the third processor when the fourth processor receives, from the second processor through the first communication device and the second communication device, a first notification that indicates that the vibration has been detected.

2. The information processing system according to claim 1, wherein
when magnitude of the vibration detected by the first detector is equal to or larger than first magnitude, the second processor causes the first processor to stop the first data processing and generates the first notification.

3. The information processing system according to claim 2, wherein
when the magnitude of the vibration detected by the first detector becomes smaller than second magnitude after becoming equal to or larger than the first magnitude, the second processor causes the first processor to restart the first data processing and generates a second notification.

4. The information processing system according to claim 3, wherein
the fourth processor causes the third processor to restart the stopped second data processing based on the second notification.

5. The information processing system according to claim 1, wherein when the second processor causes the first processor to stop the first data processing executed by the first processor, a shutdown process is not executed by the first processor, and
when the fourth processor causes the third processor to stop the second data processing executed by the third processor, the shutdown process is not executed by the third processor.

6. The information processing system according to claim 5, wherein
the shutdown process is a process of backing up data of the first data processing and the second data processing.

7. The information processing system according to claim 4, wherein
when the magnitude of the vibration detected by the first detector is equal to or larger than the first magnitude, the second processor transmits a first interrupt request to the first processor, and when the magnitude of the vibration detected by the first detector becomes smaller than the second magnitude, the second processor transmits a second interrupt request to the first processor,
the first processor stops the executed first data processing by repeating, in response to the first interrupt request, a loop process of waiting for the second interrupt request and restarts the stopped first data processing in response to the second interrupt request,
the fourth processor issues a third interrupt request to the third processor when receiving the first notification and transmits a fourth interrupt request to the third processor when receiving the second notification, and
the third processor stops the executed second data processing by repeating, in response to the third interrupt request, a loop process of waiting for the fourth interrupt request and restarts the stopped second data processing in response to the fourth interrupt request.

8. The information processing system according to claim 4, wherein
the second information processing apparatus includes a second detector configured to detect vibration,
when magnitude of the vibration detected by the second detector is equal to or larger than the first magnitude, the fourth processor causes the third processor to stop third data processing executed by the third processor without causing the third processor to execute a shutdown process transmits, to the second processor through the second communication device and the first communication device, a third notification that indicates that the magnitude of the vibration detected by the second detector is equal to or larger than the first magnitude, and
the second processor causes the first processor to stop fourth data processing executed by the first processor without causing the first processor to execute the shutdown process.

9. The information processing system according to claim 8, wherein
when the magnitude of the vibration detected by the second detector becomes smaller than the second magnitude, the fourth processor causes the third processor to restart the stopped third data processing and transmits, to the second processor through the second communication device and the first communication device, a fourth notification that indicates that the magnitude of the vibration detected by the second detector becomes smaller than the second magnitude, and
when receiving the fourth notification, the second processor causes the first processor to restart the stopped fourth data processing.

10. The information processing system according to claim 9, wherein
when the magnitude of the vibration detected by the second detector is equal to or larger than the first magnitude, the fourth processor transmits a third interrupt request to the third processor, and when the magnitude of the vibration detected by the second detector becomes smaller than the second magnitude, the fourth processor transmits a fourth interrupt request to the third processor,
the third processor stops the executed third data processing by executing, in response to the third interrupt request, a loop process of waiting for the fourth interrupt request and restarts the stopped third data processing in response to the fourth interrupt request,
the second processor transmits a fifth interrupt request to the first processor when receiving the third notification and transmits a sixth interrupt request to the first processor when receiving the fourth notification, and
the first processor stops the executed fourth data processing by executing, in response to the fifth interrupt request, a loop process of waiting for the sixth interrupt request and restarts the stopped fourth data processing in response to the sixth interrupt request.

11. The information processing system according to claim 1, wherein
the first information processing apparatus includes a first battery configured to charge power supplied from an external power supply and supply the charged power to the first processor, the first communication device, the first detector, and the second processor when the external power supply is interrupted, and
the second information processing apparatus includes a second battery configured to charge power supplied from the external power supply and supply the charged power to the third processor, the second communication device, and the fourth processor when the external power supply is interrupted.

12. The information processing system according to claim 1, wherein
the first communication device is a first wireless communication device, and
the second communication device is a second wireless communication device.

13. A method of controlling an information processing system including a first information processing apparatus and a second information processing apparatus, the method comprising:
executing first data processing using a first processor included in the first information processing apparatus;
detecting vibration using a first detector included in the first information processing apparatus;
causing, by second processor included in the first information processing apparatus, the first processor to stop the first data processing when the vibration is detected by the first detector;
transmitting a first notification using a first communication device included in the first information processing apparatus when the vibration is detected by the first detector;
executing second data processing using a third processor included in the second information processing apparatus;
receiving the first notification using a second communication device included in the second information processing apparatus; and
causing, by a fourth processor included in the second information processing apparatus, the third processor to stop the second data processing based on the first notification.

14. The method according to claim 13, further comprising:
causing, by the second processor, the first processor to stop the first data processing and generates the first notification when magnitude of the vibration detected by the first detector is equal to or larger than first magnitude.

15. The method according to claim 14, further comprising:
causing, by the second processor, the first processor to restart the first data processing and generates a second notification when the magnitude of the vibration detected by the first detector becomes smaller than second magnitude after becoming equal to or larger than the first magnitude.

16. The method according to claim 15, further comprising:
causing, by the fourth processor, the third processor to restart the stopped second data processing based on the second notification.

17. The method according to claim 13, wherein
when the second processor causes the first processor to stop the first data processing executed by the first processor, a shutdown process is not executed by the first processor, and
when the fourth processor causes the third processor to stop the second data processing executed by the third processor, the shutdown process is not executed by the third processor.

18. The method according to claim 13, wherein
the shutdown process is a process of backing up data of the first data processing and the second data processing.

19. A non-transitory computer-readable storage medium storing a program that causes an information processing system including a first information processing apparatus and a second information processing apparatus to execute a process, the process comprising:
executing first data processing using a first processor included in the first information processing apparatus;
detecting vibration using a first detector included in the first information processing apparatus;
causing, by second processor included in the first information processing apparatus, the first processor to stop the first data processing when the vibration is detected by the first detector;
transmitting a first notification using a first communication device included in the first information processing apparatus when the vibration is detected by the first detector;
executing second data processing using a third processor included in the second information processing apparatus;
receiving the first notification using a second communication device included in the second information processing apparatus; and
causing, by a fourth processor included in the second information processing apparatus, the third processor to stop the second data processing based on the first notification.

* * * * *